United States Patent [19]
Thayer

[11] 3,802,676
[45] Apr. 9, 1974

[54] METHOD FOR INSTALLING AERATION SYSTEMS IN SEWAGE TREATMENT TANKS

[75] Inventor: Paul M. Thayer, Milwaukee, Wis.

[73] Assignee: Water Pollution Control Corp., Milwaukee, Wis.

[22] Filed: Aug. 3, 1971

[21] Appl. No.: 168,685

[52] U.S. Cl............ 261/122, 138/171, 248/74 R, 285/286
[51] Int. Cl................................ B01f 3/04
[58] Field of Search ........... 261/122, 124; 285/286; 248/74 R; 138/171

[56] References Cited
UNITED STATES PATENTS

| | | | |
|---|---|---|---|
| 1,138,228 | 5/1915 | Kindervater | 285/286 X |
| 1,457,183 | 5/1923 | Mitchell | 285/286 X |
| 1,930,314 | 10/1933 | Healy et al. | 248/74 R X |
| 2,221,346 | 11/1940 | Durdin, Jr. | 261/124 |
| 2,361,636 | 10/1944 | Koppel | 285/286 X |
| 2,538,859 | 1/1951 | Bradfield | 285/286 X |
| 2,891,296 | 6/1959 | Darde | 248/74 R X |
| 3,208,935 | 9/1965 | Nesbitt | 261/124 X |
| 3,424,443 | 1/1969 | Thayer | 261/123 |
| 3,672,647 | 6/1972 | Murphy et al. | 261/121 R |

Primary Examiner—Tim R. Miles
Assistant Examiner—Richard L. Chiesa
Attorney, Agent, or Firm—Robert R. Priddy, Esq.

[57] ABSTRACT

A method of installing an aeration system in a sewage treatment tank includes the steps of prefabricating headers having transversely-extending connectors longitudinally spaced along the header, the connectors being threaded to receive air diffusers; supporting the header in a tank to extend horizontally therein; adjusting the position of support of the header to obtain a desired uniform depth in the tank for the header; leveling the header; rotating the header on its axis to level the connectors; and attaching air diffusers to the connectors.

7 Claims, 10 Drawing Figures

INVENTOR
PAUL M. THAYER

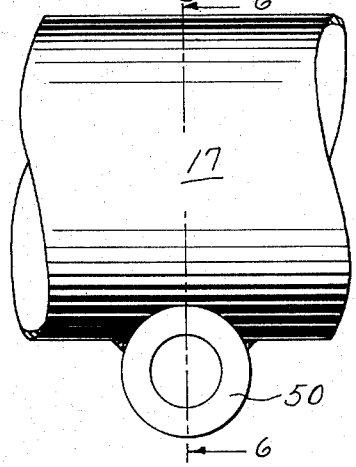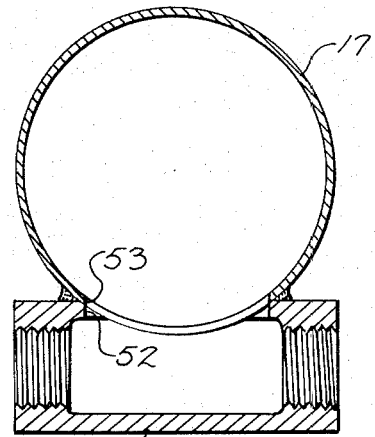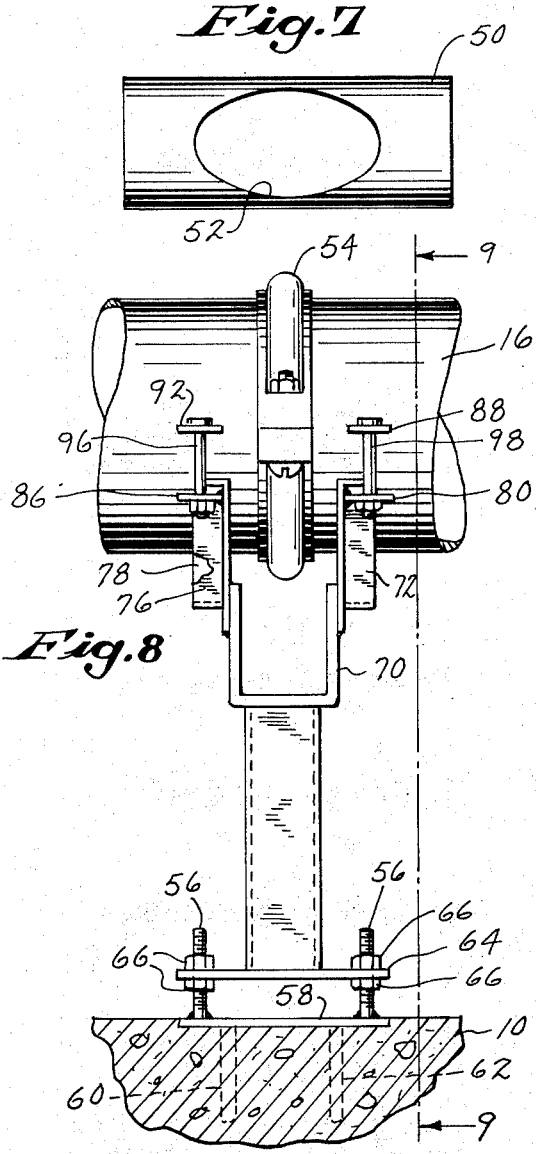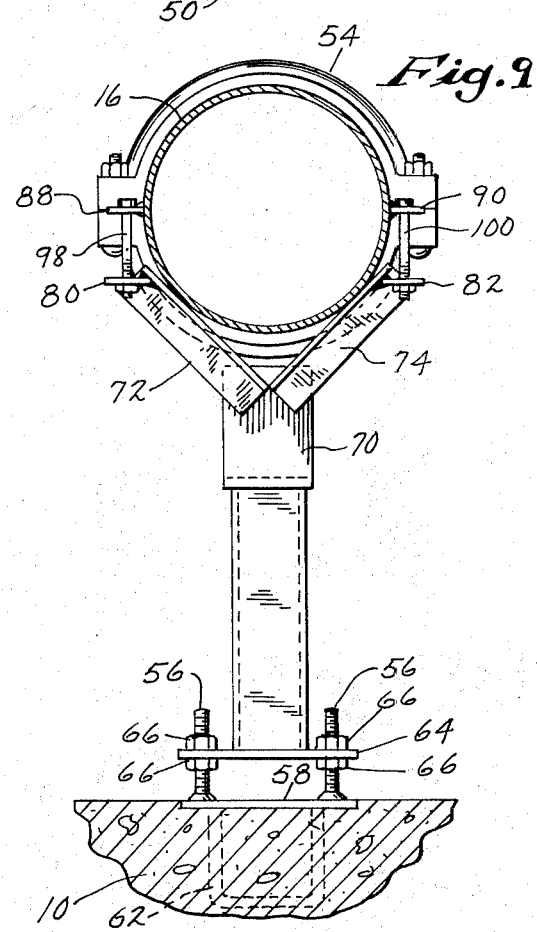

3,802,676

METHOD FOR INSTALLING AERATION SYSTEMS IN SEWAGE TREATMENT TANKS

BACKGROUND OF THE INVENTION

In sewage treatment plants, the incoming sewage, together with activated sludge, flows progressively and relatively slowly through the aerating tanks. During this time it is subjected to aeration by means of air diffusers in the tank, and the successful treatment of sewage depends heavily upon the efficient transfer of oxygen into the mixed liquor in the tank. In large tanks, the air diffusers also perform the function of inducing circulation of the liquor in the tank in a predetermined circulatory pattern. In the case of large tanks, the positioning of the air diffusers becomes critical and must be held within tight tolerances when the diffusers are installed in the tank so that the liquor to be aerated will follow the proper convection current paths for most effective aeration. Heretofore this has been accomplished by various methods which were both time consuming and relatively inaccurate. Standard pipe sections and fittings are often prepared on the construction site and are installed in the best way possible. However, the tolerances associated with the use of standard fittings makes leveling and alignment in the field very difficult and inaccurate. In the above-noted type of aeration systems, it is important that the air diffusers be accurately aligned in a horizontal direction and that the header be accurately maintained in a horizontal plane. The header must be substantially level lengthwise because it is necessary to have all of the air diffusers which are carried by the header located the same distance from the level of the liquid in the tank. In other words, the submergence of the air diffusers is critical and must be uniform throughout the length of the header. Also, it is very important that diffusers which project laterally from both sides of the header be level so that they do not project at an angle from the horizontal.

Accordingly, it is an object of this invention to provide an improved method of installing aeration systems in sewage treatment tanks whereby the headers and diffusers can be readily brought to an accurate level position during installation without complicated alignment procedures.

Another object of this invention is to provide an improved header-connector structure in which air pressure loss is minimized by providing a smooth transition between the header and the connectors attached thereto.

A further object of this invention is to provide improved means for supporting the header in an accurately aligned horizontal position within the sewage treatment tank.

An additional object of this invention is to provide sturdier and more accurate connection between the headers and the connectors coupled thereto for supporting the diffusers, and to eliminate the necessity of making connections on the site between headers and the transverse connectors.

DESCRIPTION OF THE DRAWINGS

FIG. 5 is an enlarged elevational view of a different type of connection between the header and connector;

FIG. 6 is a cross-sectional view taken along the line 6—6 of FIG. 5;

FIG. 7 is a plan view of one of the connectors alone, of the type of FIGS. 5 and 6;

FIG. 8 is an enlarged fragmentary elevational view of the supporting structure for the headers shown in FIGS. 1 and 2; and FIG. 9 is a cross-sectional view taken on the line 9—9 of FIG. 8.

DETAILED DESCRIPTION OF THE INVENTION

Figure 1:
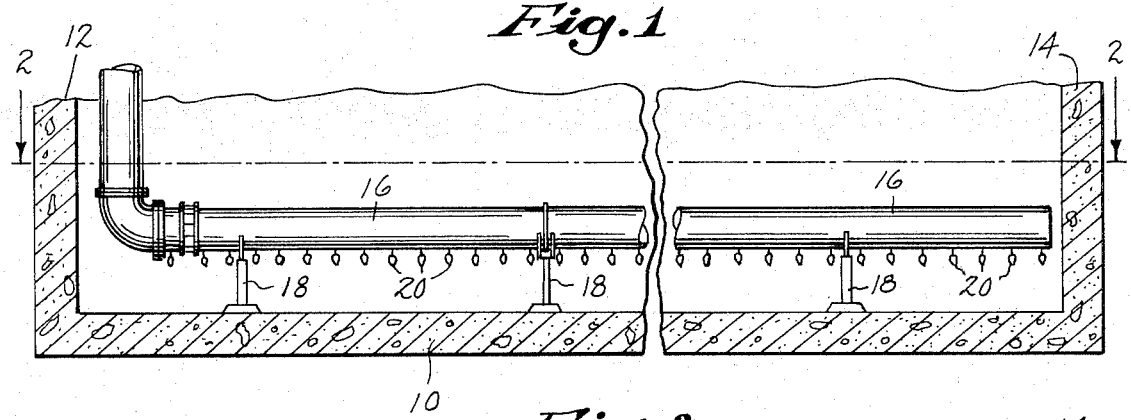
FIG. 1 is an elevational view of a header of this invention installed in a sewage treatment tank, part being broken away.
Figure 2:
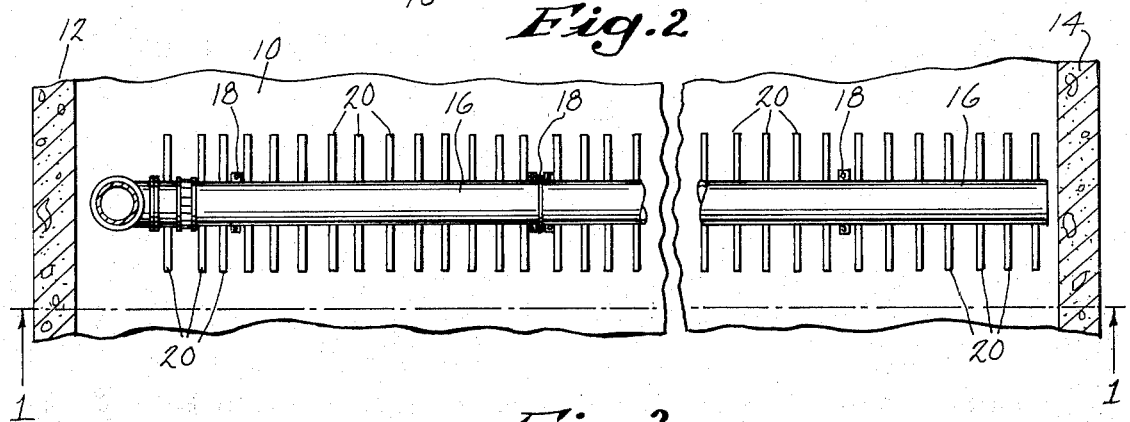
FIG. 2 is a plan view of the header shown in FIG. 1.
Figure 3:
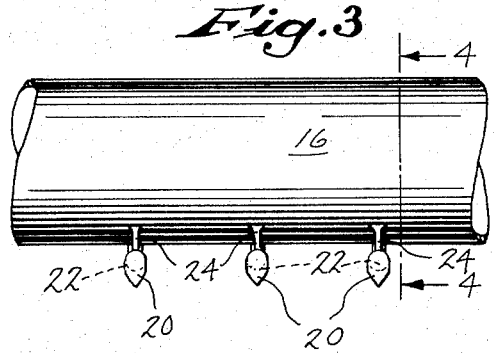
FIG. 3 is an enlarged elevational view of a portion of the header shown in FIGS. 1 and 2.

Referring to FIGS. 1 and 2, there is shown one header installed in the bottom of a sewage treatment tank. In the practical application of this invention, a plurality of headers may be used in any one sewage treatment tank. One type of installation is disclosed in detail in my co-pending application U.S. Pat. Ser. No. 881,709, which was filed on Dec. 3, 1969, for an "Apparatus for and Method of Aerating Liquor in Large Sewage Treatment Tanks." The relationship between the headers and the tank is disclosed in said co-pending patent application. Since the present invention does not deal with the relationship between the headers, however, only a single header is disclosed in the drawings of this application.

In FIGS. 1 and 2, the sewage treatment tank is represented by a concrete floor 10 and two concrete side walls 12 and 14. The header 16 is supported on the bottom 10 of the tank by means of supporting members 18 to be hereinafter described in greater detail. Projecting from both sides of the header 16 are diffusers 20 which are attached to opposite ends of diffuser connectors 22. In certain header installations, such as near a wall, there may be a diffuser at one end only of a connector. The detailed construction of diffusers 20 is described in my U.S. Pat. No. 3,424,443, which was issued on Jan. 28, 1969, for an "Apparatus for Diffusing Gas into a Liquid."

This invention is principally concerned with a method of installing the headers 16, connectors 22, and diffusers 20 in such a way as to accurately position the headers 16 and diffusers 20 in a predetermined horizontal plane at the proper location to produce the desired circulatory effect on the liquor in the sewage treatment tank.

Figure 4:
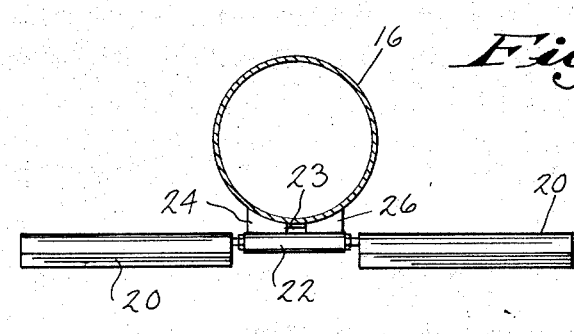
FIG. 4 is a cross-sectional view taken along the line 4—4 of FIG. 3.
Figure 4A:
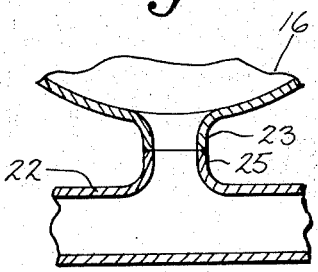
FIG. 4A is an enlarged fragmentary cross-sectional view of the joint between the header and diffuser.

In accordance with one embodiment of the invention, the connectors 22 are prefabricated in position on the headers 16 as shown in FIGS. 4 and 4A, with the connectors 22 being accurately aligned with the other connectors 22 and being held in position by brackets 24 and 26, which are cut to accurately fit in the space between connectors 22 and header 16, and are then welded in position to maintain each connector 22 in its proper orientation with respect to the axis of header 16. In the particular embodiment of the invention shown in FIGS. 4 and 4A, the connectors 22 have nipples 25 drawn therefrom which are welded to short nipples 23 drawn from the bottom of the header 16.

Referring to FIGS. 1 through 4, the method of this invention includes the steps of (a) prefabricating the header 16 with the connectors 22 welded onto the header 16 at spaced longitudinal positions along the header, with all of the connectors 22 in the same plane with each other and each connector extending perpendicular to the axis of header 16; (b) placing the prefabricated header 16 and connectors 22 within the tank and supporting it within the tank in a predetermined horizontal position; and (c) screwing the diffusers 20 onto the connectors 22, usually after the connectors 22 have been horizontally aligned, so that the diffusers 20 will be horizontally aligned when they are installed. As subsidiary steps within the major steps noted above, the method of this invention also includes the steps of leveling the header and rotating the header about its axis to level the connectors.

With regard to the first step of the above-noted method, i.e., the prefabrication of the header 16 and connectors 22, it should be noted that the invention is not limited to the particular connector configuration shown in FIG. 4, but rather that any suitable connector configuration can be used. FIGS. 5, 6, and 7 show a different connector configuration that can be used in place of the configuration shown in FIGS. 3 and 4 and 4A. In this modification a straight connector 50 has an oval-shaped opening 52 cut therein and a matching oval-shaped opening 53 is cut into a header 17. The connector 50 is then joined to the header 17 by placing the two oval cut-outs together and welding the connector 50 to the header 17 along the juncture of the connector and the header. This configuration may be preferable in some applications because of the relative low resistance to the passage of air that it provides in comparison to the embodiment shown in FIGS. 3 and 4. It should be understood, however, that either type of connection can be used in the initial step of this invention.

In the prefabrication of the header and connector assemblies it is preferable to use precision fixtures so that the connectors will be attached to the headers very accurately with respect to their alignment relative to the axis of the header and to each other. And, in addition to the connectors 22 or 50, means must be mounted upon the header for receiving header supports and for providing for the adjustability of the header when it is supported within the sewage treatment tank.

FIGS. 8 and 9 show the support means for supporting the header in the tank. The illustrated support is positioned at a joint between two sections of the header 16 which are joined together by an airtight clamp 54 which can be any suitable type of prior art clamp that will provide an airtight joint between the two header sections. The bottom of the header support rests on four bolts 56 which project upwardly from a floor plate 58 which is cast into the concrete floor 10 of the sewage treatment tank and secured therein by two downwardly-depending U-shaped members 60 and 62. A bottom plate 64 having four openings formed therein is adjustably-disposed upon the bolts 56 by means of nuts 66 which are positioned both below and above the plate 64. An I-beam 68 is attached to the center of the plate 64 and supports a U-shaped bracket 70 which supports two V-shaped cradles comprising the arms 72, 74, 76, and 78. Each of the arms 72, 74, 76, and 78 are fitted at the upper extremity of the arm with corresponding horizontal lugs 80, 82, and 86, and a fourth lug which is behind lug 82 in FIG. 9. Each of the lugs 80, 82, and 86 has an opening therein to receive a bolt which depends downwardly from matching lugs 88, 90, and 92, all of which are welded to the sides of header 16. The lugs 88, 90, and 92 have openings therein for receiving bolts 96, 98, and 100. A fourth bolt which cannot be seen in the drawings engages a pair of lugs like the lugs 90 and 82, behind bolt 100 in FIG. 9 and on the other side of the pipe from bolt 96 in FIG. 8. The bolts 96, 98, 100 and the unseen bolt provide a means of rotating the headers 16 about their longitudinal axis during the installation process so as to align the axis of the connectors attached thereto in the horizontal plane. The bolts 56 which project up from the floor plate 58 provide a means of leveling the base support of the header 16 both vertically and horizontally.

Although the above-described means for supporting the header is preferable in this embodiment of the invention, it should be understood that the invention is not limited to this particular type of support but that any suitable type of support can be used for supporting the headers, leveling them in the horizontal plane, and rotating them about their longitudinal axis to level the connectors in their horizontal plane. After these steps have been properly taken, the process of installing and leveling the diffusers 20 reduces itself to the simple procedure of screwing the diffusers 20 into the threaded portions of the connectors 22.

From the foregoing description it can be seen that this invention provides an improved method of installing aeration systems in sewage treatment tanks whereby the headers and diffusers can be readily brought to an accurate level position during installation without complicated alignment proceedings. And, although the invention has been described with reference to certain embodiments, it should be understood that the invention is by no means limited to the disclosed embodiments since modifications can be made in the disclosed structure without departing from the fundamental principles of operation thereof. For example, although the header described in this application has diffusers extending from both sides, it will be clear that in some applications it may be either necessary or desirable to have the diffusers extending from one side only of the header. In addition, although the disclosed supports 18 for the header utilize two V-shaped cradles to hold the headers, it may be desirable in some applications to utilize supports having only one V-shaped cradle.

These and many other modifications will be apparent to those skilled in the art, and this invention includes all such modifications falling within the scope of the following claims.

I claim:

1. A method of installing an aeration system in a sewage tank comprising the steps of:
    a. prefabricating headers having transversely extending connectors coupled thereto and longitudinally spaced along the headers, said connectors being threaded to receive air diffusers;
    b. supporting one end of a first header in a first cradle in said tank to extend horizontally therein;
    c. supporting the adjoining end of a second header section in a second cradle in said tank to extend horizontally therein;
    d. said first and second cradles being connected to one another in axial alignment and disposed on opposite sides of a joint formed between the respective ends of said first and second header sections, said cradles being connected to and supported on a common vertical support member which engages the surface of said tank;

e. adjusting the position of said common vertical support member to obtain the desired positioning of said header sections in the tank;

f. rotating the headers around their longitudinal axes in said cradle means to level the connectors attached thereto; and g. attaching air diffusers to the ends of said connectors.

2. The method defined in claim 1 and further comprising the step of prefabricating support means for supporting said headers and adjusting their position in said tank.

3. A method as claimed in claim 1 in which the prefabricating of the headers with connectors coupled thereto includes the steps of forming longitudinally spaced openings in the headers, forming an opening in each connector, and welding the margin of each connector opening to one of the header openings.

4. A method as claimed in claim 3 in which oval openings are formed in the headers and connectors.

5. A method as claimed in claim 3 in which the prefabricating of the headers with the connectors coupled thereto includes the step of maintaining a predetermined orientation of the connectors with respect to the axis of the header by additionally connecting the connectors to the header laterally on each side of the longitudinally spaced header openings.

6. A method as claimed in claim 3 in which the margins of the openings in the headers are drawn outwardly to provide nipples, and in which the margins of the openings of the connectors are drawn outwardly to form nipples, and in which the end of the nipple of a connector is welded to the end of a nipple of the header.

7. A method as claimed in claim 6 which includes the step of maintaining a predetermined orientation of the connectors with respect to the axis of the header by welding connection brackets between the connectors and the header laterally on each side of the nipples.

* * * * *